US012624771B2

(12) United States Patent (10) Patent No.: US 12,624,771 B2
Ornot (45) Date of Patent: May 12, 2026

(54) STOP VALVE FOR INSTALLATION IN A PIPELINE, IN PARTICULAR IN A PIPELINE OF A NUCLEAR FACILITY

(71) Applicant: Kernkraftwerk Gösgen-Däniken AG, Däniken (CH)

(72) Inventor: Leo Ornot, Oberentfelden (CH)

(73) Assignee: Kernkraftwerk Gösgen-Däniken AG, Däniken (CH)

( * ) Notice: Subject to any disclaimer, the term of this patent is extended or adjusted under 35 U.S.C. 154(b) by 982 days.

(21) Appl. No.: 17/783,225

(22) PCT Filed: Dec. 8, 2020

(86) PCT No.: PCT/EP2020/084974
§ 371 (c)(1),
(2) Date: Jun. 7, 2022

(87) PCT Pub. No.: WO2021/116053
PCT Pub. Date: Jun. 17, 2021

(65) Prior Publication Data
US 2023/0023113 A1     Jan. 26, 2023

(30) Foreign Application Priority Data
Dec. 9, 2019     (EP) .................................... 19214504

(51) Int. Cl.
*F16K 31/00* (2006.01)
*F16K 15/06* (2006.01)
*F16K 37/00* (2006.01)

(52) U.S. Cl.
CPC .......... *F16K 31/002* (2013.01); *F16K 15/063* (2013.01); *F16K 37/0041* (2013.01)

(58) Field of Classification Search
USPC ........................................................ 126/344
See application file for complete search history.

(56) References Cited

U.S. PATENT DOCUMENTS 3,626,474 A     12/1971  Hammer
4,359,895 A  *  11/1982  Wolff ..................... G01D 5/145
340/870.31

(Continued)

FOREIGN PATENT DOCUMENTS

CN          1299452        2/2007
CN      110410540  B      8/2024
(Continued)

OTHER PUBLICATIONS

Search Report for Russian Patent Application No. 2022118634 (Mar. 7, 2024).

(Continued)

*Primary Examiner* — Steven B Mcallister
*Assistant Examiner* — John E Bargero
(74) *Attorney, Agent, or Firm* — Merchant & Gould P.C.

(57) ABSTRACT

A stop valve for installation in a pipeline is utilized to stop a fluid flow through the pipeline in the event of an operational failure. The valve includes a valve housing including a flow channel therethrough, and a closure member arranged at least partially in the flow channel and reversibly transferrable between an open position and a closed position. The valve further includes a non-electrically driven actuator mechanism operatively coupled to the closure member for transferring the closure member at least from the open position to the closed position. The actuator mechanism is configured to be activated by a fluid flow through the flow channel. The valve includes at least one position indicator to indicate whether the closure member is in the open position or in the closed position. The position indicator includes at least one indicator member movably magnetically coupled to the closure member.

16 Claims, 3 Drawing Sheets

(56) References Cited

U.S. PATENT DOCUMENTS

| | | | | |
|---|---|---|---|---|
| 5,655,568 A * | 8/1997 | Bhargava | ............. | G05D 7/0146 |
| | | | | 137/557 |
| 5,727,391 A * | 3/1998 | Hayward | .............. | B25J 9/1085 |
| | | | | 60/528 |
| 6,679,291 B1 * | 1/2004 | Fahl | .................... | F16K 37/0058 |
| | | | | 141/94 |
| 7,237,511 B2 | 7/2007 | Aoki et al. | | |
| 2003/0111004 A1 | 6/2003 | Enzaki | | |
| 2016/0069472 A1 | 3/2016 | Gustafson | | |
| 2018/0119879 A1 | 5/2018 | Hess et al. | | |
| 2019/0144981 A1 * | 5/2019 | Seto | .................. | B23K 35/3086 |
| | | | | 148/327 |

FOREIGN PATENT DOCUMENTS

| | | | |
|---|---|---|---|
| SU | 31243 | A1 | 7/1933 |
| SU | 80119 | A1 | 9/1950 |
| WO | 2017/042189 | A1 | 3/2017 |

OTHER PUBLICATIONS

Extended Search Report for European Patent Application No. 25150082.3 dated Apr. 2, 2025, 8 pages.

English Translation of Chinese Office Action dated Apr. 2, 20254 for Chinese Patent Application No. 2020800851337, 24 pages.

International Search Report and Written Opinion for PCT/EP2020/084974. (Jan. 15, 2021).

International Preliminary Report on Patentability for PCT/EP2020/084974. (Mar. 18, 2022).

* cited by examiner

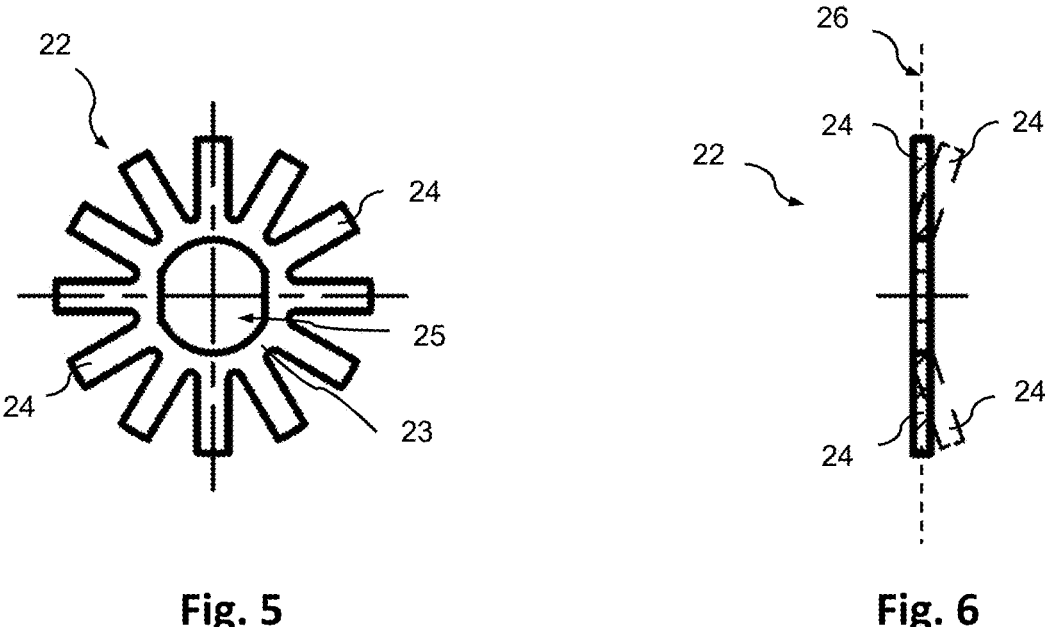
Fig. 5
Fig. 6
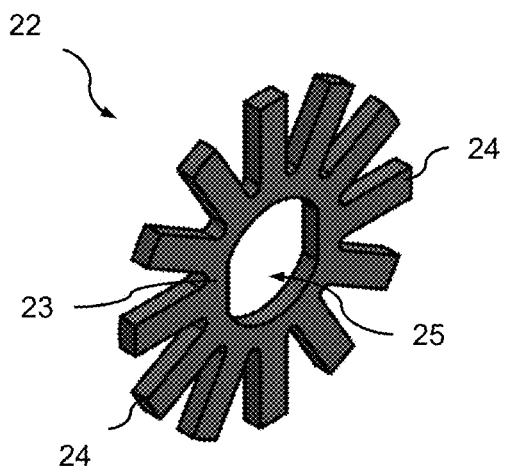
Fig. 7

STOP VALVE FOR INSTALLATION IN A PIPELINE, IN PARTICULAR IN A PIPELINE OF A NUCLEAR FACILITY

CROSS-REFERENCE TO RELATED APPLICATIONS

This application is a US National Stage Application of PCT International Patent Application No. PCT/EP2020/084974, filed Dec. 8, 2020, which claims the benefit of priority to European Patent Application No. 19214504.3, filed Dec. 9, 2019, which applications are incorporated herein by reference. To the extent appropriate, a claim of priority is made to each of the above disclosed applications.

FIELD

The present invention relates to a stop valve for installation in a pipeline, in particular in a pipeline of a nuclear facility, such as a nuclear power plant, or in a conventional chemical reactor and in a conventional power plant, in order stop a fluid flow through the pipeline in the event of an operational failure.

BACKGROUND

In many industrial facilities pipelines passing through different areas of the facility may be fitted with so-called stop valves to immediately stop a fluid flow through the pipeline in the event of an operational failure and, thus, to prevent an undesired fluid leakage in areas downstream of the valve. For example in nuclear power plants, pipelines may pass through the reactor containment to fluidly couple the primary coolant circuit inside the containment with a measuring or sampling device outside the containment. As a standard, such pipelines may be fitted with stop valves in order to prevent radioactivity, humidity, loss of cooling fluid and loss of system pressure from escaping in areas outside the containment in the event of an excessive fluid temperature and/or flow rate in the pipeline. Such excessive temperature and/or flow rate conditions may be due to an operational failure, such as a pipeline leak inside or outside the reactor containment.

Mostly, stop valves are actively controlled and actuated in order to properly close in the event of an operational failure. However, in case the power supply for the active control and actuation fails, proper function of the actively controlled valve is no longer guaranteed. Alternatively, stop valves may be configured to close in a passive manner in the event of an operational failure. Such valves may comprise an actuator mechanism for transferring a closure member of the valve into a closed position which is automatically activated at a critical temperature or peak pressure of the fluid flowing through the valve. For example, as described in WO 2017/042189 A1, the activation mechanism may comprise an actuator spring assembly comprising a shape-memory material which changes its shape upon reaching or exceeding a switching temperature due to heating by the fluid and, thus, transfers a closure member from an open position into the closed position.

For determining whether the valve is in a closed or in an open position, position sensors may be provided at the valve which determine the current position of the closure member. Typically, such position sensors are capacitive or inductive sensors. Advantageously, capacitive or inductive sensors may be read out remotely from a control center. However, these sensor types necessarily require an electrical power supply and, thus, are also prone to failure in case of a power breakdown. In addition, these sensor types require some means for data processing, in particular for converting and displaying the sensor signal, in order to be able to indicate the actual valve position at all.

Therefore, it is an object of the present invention to provide a stop valve for installation in a pipeline which reliably closes in a passive manner and allows for reliably determining whether the valve is in a closed or in an open position. This object is achieved by a stop valve according to independent claim 1. Advantageous embodiments of the invention are subject of the dependent claims.

SUMMARY

According to a first aspect of the invention, there is provided a stop valve for installation in a pipeline, in particular in a pipeline of a nuclear facility, such as a nuclear power plant, or in a conventional chemical reactor and in a conventional power plant, in order stop a fluid flow through the pipeline in the event of an operational failure, for example, in the event of a pipeline leak. The stop valve comprises a valve housing including a flow channel passing through the valve housing. The stop valve further comprises a closure member which is arranged at least partially in the flow channel and reversibly transferrable between an open position and a closed position such as to open or close the flow channel through the valve housing. Furthermore, the stop valve comprises a non-electrically driven actuator mechanism operatively coupled to the closure member for transferring the closure member at least from the open position in the closed position. The actuator mechanism is configured to be activated by a fluid flow through the flow channel reaching or exceeding a switching temperature and/or switching flow rate during operation. The actuator mechanism is configured to be automatically activated in case a fluid flow through the flow channel reaches or exceeds a switching temperature and/or switching flow rate during operation. In addition, the stop valve comprises at least one position indicator to indicate whether the closure member is in the open position or in the closed position. The position indicator comprises at least one indicator member movably arranged in or at the valve housing between a first position and a second position. The indicator member is magnetically coupled to the closure member such that the indicator member is magnetically transferred into the first position when the closure member is transferred into the open position and into the second position when the closure member is transferred into the closed position.

BRIEF DESCRIPTION OF THE SEVERAL VIEWS OF THE DRAWINGS

The invention will be further described, by way of example only, with reference to the accompanying drawings, in which:

FIG. 5 illustrates an exemplary embodiment of a star washer used in the stop valve according to FIG. 1 in a front view.

FIG. 6 is a side view of the star washer according to FIG. 5 showing both, the deformed and the unreformed configuration.

FIG. 7 is a perspective view of the star washer according to FIG. 5.

DETAILED DESCRIPTION

Figure 1:
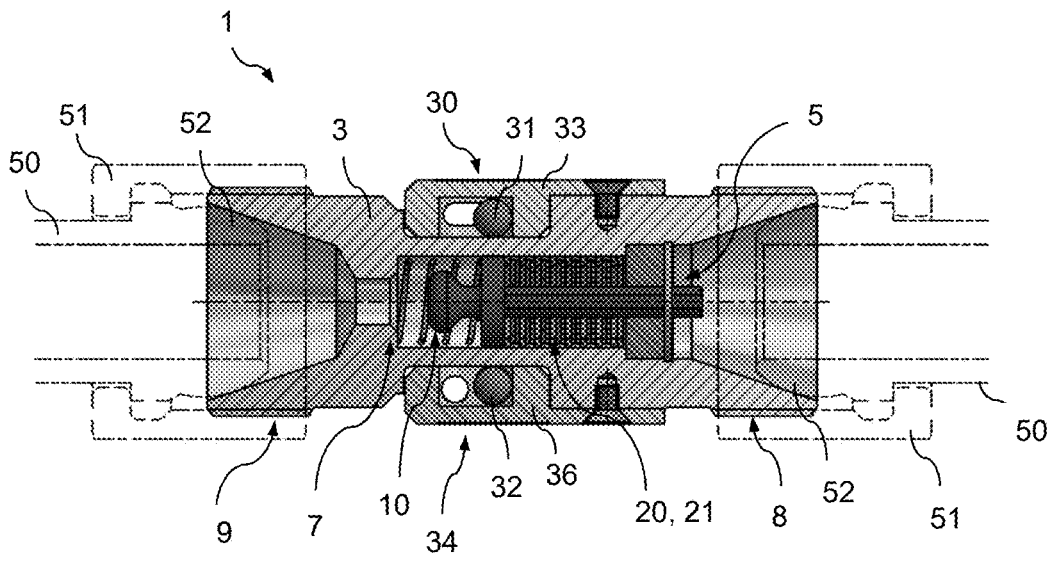
FIG. 1 illustrates an exemplary embodiment of a stop valve according to the present invention in a sectional view.

According to the invention a reliable indication of the valve position (open/closed) status closed) is realized by an indicator member which is magnetically coupled to the closure member and, thus, passively follows the movement of the closure member between the closed and open position. The magnetic coupling between the indicator member and the closure member is of permanent nature and without interference. Advantageously, this allows for a reliably and failure-free operation in any circumstances. In particular, the magnetic coupling does not require any external power supply. For this reason, the indicator still indicates the valve position properly even in case of a total power breakdown in the facility.

The same holds for the non-electrically driven actuator mechanism itself which also works independently from any electrical power source. The mechanical energy provided by the actuator mechanism for transferring the closure member from the open position in the closed position may result from mechanical energy stored in the actuator mechanism itself, for example by means of a spring pre-load, i.e. energy stored in a pre-loaded actuator spring or a pre-loaded actuator spring assembly. Alternatively or additionally, the energy may result from a temperature-induced phase transformation of a material forming at least a part of the actuator mechanism, for example from a temperature-induced phase transformation of a shape-memory material. Alternatively or additionally, the energy may result from a temperature-induced chemical reaction. The energy may also result at least partially from energy stored in or carried in the fluid flowing through the stop valve, in particular in as thermal energy and/or as pressure impulse. That is, an actuating force of the actuator mechanism exerted on the closure member may be given by the spring force of an actuator spring or an actuator spring assembly acting on the closure member. Likewise, an actuating force may be caused by the fluid flow (mass flow) through the flow channel acting on the closure member, in particular when the fluid flow reaches or exceeds the switching flow rate.

To this extent, the stop valve according to the present invention may be denoted as a passive, temperature- and/or pressure-sensitive, self-actuated and automatically operating stop valve. The stop valve according to the present invention may also be denoted as a shut-off valve or a leak stop valve.

For connection with the pipeline, the valve housing may comprise at each end a connector portion, in particular a threaded connector portion having an external thread. The connector portion may be configured for connection with respective coupling ends of the pipeline. For fixing the connector portions with the coupling ends of the pipe, each coupling end may comprise a coupling member, for example a coupling nut in case of a threaded connector portion at each end of the valve housing. Alternatively or in addition to a screw fitting, the stop valve may be welded or soldered with the corresponding coupling ends of the pipeline. Advantageously, any of these fitting types allows for achieving a high degree of tightness and load capacity.

Preferably, the at least one position indicator is a visual position indicator. Accordingly, the indicator member preferably is a visual indicator member. In particular, the indicator member is preferably visible from outside the valve housing when being in at least one of the first position or the second position. More preferably, the indicator member is visible from outside the valve housing when being in each one of the first position and the second position. Advantageously, this allows for determining the position of the closure member by mere inspection of the valve from outside.

In general, the indicator member may be magnetically coupled to the closure member either directly or indirectly. As used herein, direct magnetic coupling refers to a direct magnetic interaction between at least a portion of the closure member and at least a portion of the indicator member.

As an example, the indicator member may comprise or consist of a permanent-magnetic material and the closure member may comprise or consist of a permanent-magnetic material or a magnetic material. As another example, the indicator member may comprise or consist of a magnetic material and the closure member may comprise or consist of a permanent-magnetic material.

Vice versa, an indirect magnetic coupling refers to a configuration in which a coupling element is fixedly coupled to at least one of the closure member or the indicator member which magnetically interacts with the respective other member or another coupling element that is fixedly coupled to the respective other member. The respective coupling element is fixed to the indicator member or the closure member, respectively, such as to move with the indicator member when the indicator member is transferred between the first position and the second position, or such as to move with the closure member when the closure member is transferred between the open position and the closed position.

As an example, an indicator coupling element may be fixedly coupled to the indicator member and may comprise or consist of a permanent-magnetic material, and the closure member may comprise or consist of a permanent-magnetic material or a magnetic material.

As another example, an indicator coupling element may be fixedly coupled to the indicator member and may comprise or consist of a magnetic material, and the closure member may comprise or consist of a permanent-magnetic material.

As yet another example, an indicator coupling element may be fixedly coupled to the indicator member and may comprise or consist of a permanent-magnetic material, and a closure coupling element may be fixedly coupled to the closure member and may comprise or consist of a permanent-magnetic material or a magnetic material.

As still yet another example, an indicator coupling element may be fixedly coupled to the indicator member and may comprise or consist of a magnetic material, and a closure coupling element may be fixedly coupled to the closure member and may comprise or consist of a permanent-magnetic material.

Vice versa, the indicator member may comprise or consist of a permanent-magnetic material, and a closure coupling element may be fixedly coupled to the closure member and may comprise or consist of a permanent-magnetic material or a magnetic material.

Alternatively, the indicator member may comprise or consist of a magnetic material, and a closure coupling element may be fixedly coupled to the closure member and may comprise or consist of a permanent-magnetic material.

Preferably, the indicator member and/or an indicator coupling element fixedly coupled to the indicator member comprises or consists of a permanent-magnetic material. For example, the indicator member and/or the indicator coupling element fixedly coupled to the indicator member may comprise or consist of a neodymium-iron-boron permanent magnet or a samarium-cobalt permanent magnet. Likewise, the closure member and/or a closure coupling element fixedly coupled to the closure member preferably comprises or consists of a magnetic material.

As used herein, the term magnetic material refers to a ferromagnetic or ferrimagnetic material which is magnetizable in an external magnetic field magnetic field. Here, the external magnetic field results from the permanent-magnetic material of the indicator member, the closure member or one of the indicator coupling element or the closure coupling element which are fixedly coupled to the indicator member or the closure member, respectively. Preferably, the magnetic material has a Curie temperature above a possible maximum temperature of the fluid flowing through the stop valve. Otherwise, there might be a risk that the magnetic material loses its magnetic character causing the magnetic coupling between the closure member and the indicator member to break down. Accordingly, the magnetic material may have a Curie temperature above 400 degree Celsius, preferably above 500 degree Celsius, more preferably above 600 degree Celsius, even more preferably above 700 degree Celsius.

For example, the magnetic material may comprise or may be martensitic stainless steel of the EN type 1.4122 (DIN: X39CrMo17-1).

In contrast, the valve housing preferably is made of a non-magnetic material, in particular an austenitic stainless steel. Advantageously, this allows for a free movement of the indicator member between the first and second position without any magnetic coupling of the indicator member and the valve housing. That is, having the valve housing made of a non-magnetic material avoids magnetic interference of the valve housing with the indicator member and the closure member, and thus a magnetic attraction of the indicator member by the valve housing.

Preferably, the indicator member has a ball shape. Advantageously, a ball shape allows for a low friction movement of the indicator member between the first and second position without the risk of canting.

The indicator member may be moveably guided between the first position and the second position in a guide cage. The guide cage may be part of the valve housing. Alternatively, the guide cage may be a part separate from the valve housing. In the latter case, the guide cage preferably is fixedly attached to the valve housing, for example by at least one screw.

The guide cage may comprise an elongate cavity defining a guide track for the respective indicator member: The guide track may be aligned parallel to the trajectory of the closure member between the open position and the closed position. Furthermore, the length of the guide track, in particular the length of the elongate cavity, may substantially correspond to the stroke length of the closure member between the open position and the closed position. The respective ends of the guide track may define the first and second position of the indicator members. In particular, when the indicator member is in the first positon, it may abut a first (upstream) end of the guide track of the guide cage. Likewise, when the indicator member is in the second position, it abut may a second (downstream) end of the guide track of the respective guide cage.

Like the valve housing, the guide cage preferably is also made of a non-magnetic material, in particular an austenitic stainless steel. Advantageously, this allows free movement of the indicator member within the guide cage.

For determining the position of the closure member by mere inspection of the valve from outside, the guide cage may comprise at least one inspection window. The inspection window may be an open inspection window, in particular an inspection opening through a wall member of the guide cage into the interior of the guide cage. The at least one inspection window preferably is configured and arranged to release a view on the indicator member from outside the valve housing when the indicator member is in at least one of the first position or the second position. As an example, the guide cage may comprise a first inspection window configured and arranged to release a view on the indicator member from outside the valve housing when the indicator member is in the first position. In addition, the guide cage may comprise a second inspection window configured and arranged to release a view on the indicator member from outside the valve housing when the indicator member is in the second position. Alternatively, the guide cage may comprise a single inspection window configured and arranged to release a view on the indicator member from outside the valve housing when the indicator member is in the first position as well as when the indicator member is in the second position. In particular, the (single) inspection window may extend along the entire guide track. For example, the (single) inspection window may be an elongate inspection window extending along the entire guide track. The size and shape, in particular the cross-section, of the inspection window is chosen such that the indicator member is still caught within the cage but cannot escape through the inspection window. The cross-section of the inspection window—as seen along a line of sight through the inspection window—may be one of circular, elliptical, oval, rectangular or quadratic. In the latter two configurations, the corners of the rectangular or quadratic cross-section may be rounded.

As mentioned further above, the energy required for transferring the closure member from the open position in the closed position may result from a temperature-induced phase transformation of a material forming at least a part of the actuator mechanism. Accordingly, the non-electrically driven actuator mechanism may comprise an actuator spring assembly comprising or being made of a shape-memory material. The actuator spring assembly may be operatively coupled to the closure member and arranged at least partially in the flow channel such as to be in direct contact with a fluid flowing through the flow channel during operation. Due to this, the actuator spring assembly is in direct thermal contact with the fluid, enabling thermal energy being transferred from the fluid to the actuator spring assembly, in particular to the shape-memory material, or vice versa. Thus, the temperature of the actuator spring assembly, in particular of the shape-memory material, follows the temperature of the fluid flowing through the flow channel. The actuator spring assembly comprising the shape-memory material may be configured to change its shape upon reaching or exceeding a switching temperature due heat exchange with the fluid, thereby transferring the closure member from the open position in the closed position.

As used herein, the term shape-memory material refers to a material that can be deformed when cold but returns to its pre-deformed ("remembered") shape when heated. The shape memory effect (SME) occurs because a temperature-induced phase transformation reverses deformation.

Preferably, the shape-memory material is a two-way shape-memory material. A two-way shape-memory material shows a shape-memory effect during both heating and cooling. A two-way shape-memory material remembers two different shapes: one at low temperatures, and one at the high temperature.

For example, the shape-memory material may be an austenitic titanium alloy, in particular an austenitic nickel-titanium alloy, for example a nickel-titanium alloy with about 55-60 weight-percent nickel, or a nickel-titanium-hafnium alloy. Nickel-titanium alloys change from austenite to martensite upon cooling. The transition from the martensite phase to the austenite phase is only dependent on temperature and stress, but not on time.

The switching temperature of the shape memory material preferably is a range between 160 degree Celsius and 350 degree Celsius, preferably around 220 degree Celsius, depending on the specific application. Preferably, the switching temperature is above 160 degree Celsius, in particular above 180 degree Celsius or above 200 degree Celsius or above 215 degree Celsius.

According to a preferred embodiment, the actuator spring assembly may comprise a stack of star washers each of which comprises a washer ring and a plurality of spring arms extending in a star-shaped manner radially outward from the washer ring. Preferably, each star washer comprises at least three spring arms, in particular three, four five, six, seven, eight, nine, ten eleven, twelve or more than twelve springs arms. Preferably, the spring arms are equally disturbed around the outer circumference of the washer ring.

Each star washer comprises or is made of a shape-memory material. Preferably, each star washer is configured such that upon reaching or exceeding the switching temperature the star washer experiences a specific axial expansion along a length axis of the stack due to its arms bending in a direction transverse to a plane defined by the washer ring. Due to this, the actuator spring assembly experiences an axial expansion along a length axis of the stack which causes the transfer of the closure member from the open position in the closed position.

Below the switching temperature, each star which is preferably in a flat configuration in which the spring arms are within a plane defined by the washer ring. In the flat configuration, each star washer has an axial dimension, i.e. a thickness in a range between 0.5 mm and 2 mm, in particular between 0.5 mm and 1 mm, preferably between 0.6 mm and 0.8 mm.

Each star washer may be configured such that the specific free axial expansion, i.e. the increase of the axial dimension of the star washer when turning from the flat configuration into a bend configuration—in which the spring arms bend in a direction transverse to the plane defined by the washer—is in a range between 0.2 mm and 1 mm, in particular between 0.3 mm and 0.7 mm, preferably about 0.5 mm. In general, the specific free axial expansion depends on a plurality of factors, such as the specific type of the shape-memory material, the length of the spring arms, and the thickness of the star washer.

Preferably, the number of star washers forming the stack is chosen such that a sum over the specific free axial expansions of all the star washers, which corresponds the total free axial expansion of the stack, is at least 105 percent in particular at least 110 percent of a stroke length of the closure member between the open position and the closed position. As used herein, the specific free axial expansion of each star spring and the free axial expansion of the stack, respectively, refer to the specific axial expansion of each star spring and the axial expansion of the stack without any external confinement, in particular when being not arranged in the valve housing. Due to the total free axial expansion the stack larger than a stroke length of the closure member, the stack of star washers is biased upon having expanded and transferred the closure member in the closed position. Thus, the stack of star washers exerts an spring force on the closure member which is used to securely press the closure member against a valve seat and thus to securely stop a fluid flow through the valve and the pipeline fitted thereto.

In order to avoid excessive stress on the actuator spring assembly and the valve seat, the number of star washers forming the stack preferably is chosen such that a sum over the specific free axial expansions of all the star washers is at most 150 percent of a stroke length of the closure member between the open position and the closed position.

Preferably, the star washers arranged such that the arms of neighboring star washers bend in opposite directions. Advantageously, this allows for achieving a large stroke length using a small number of star washers in the stack. This configuration may be noted as a sack of star washers in a series connection.

Furthermore, the stop valve may comprise at least one support ring between each pair of neighboring star washers. In particular, the stop valve may comprise at least one support ring between each pair of neighboring star washers the arms of which bend towards each other upon reaching or exceeding the switching temperature. Advantageously, the support rings prevent the opposing arms bending towards each other from hocking together. Preferably, the support rings are made of a non-magnetic material, in particular an austenitic stainless steel.

In addition to the actuator mechanism used for transferring the closure member from the open position in the closed position, the stop valve may further comprise a return mechanism which is arranged and configured to transfer the closure member from the closed position back in the open position. The return mechanism may be arranged opposite to the actuator mechanism such as to act in a direction opposite to an effective operation of the actuator mechanism. For example, the return mechanism and the actuator mechanism may be arranged on opposite sides of a structural element of the closure member, for example a guiding disc of the closure element, which forms an abutment for both, the actuator mechanism and the return mechanism, at respective opposing sides. The return mechanism may comprise a return spring, in particular a helical return spring, which exerts a counteracting spring force directed in the open position of the closure member. The counteracting spring force of the return spring preferably is less than the actuating force of the actuator mechanism directed in the closed position. For example, the spring force of the return spring is about 50% of the actuating force of the actuator mechanism, such that the force directed in the closed position exceeds any forces directed in the open position. In particular, the counteracting spring force of the return spring may be less than the spring force of the actuator spring assembly when the actuator mechanism is activated. As described above, the actuating force exerted on the closure member by the actuator mechanism may be given by the spring force of an actuator spring or an actuator spring assembly acting on the closure member. Likewise, as also described above, an actuating force may be caused by the fluid flow (mass flow) through the flow channel acting on the closure member, in particular when the fluid flow reaches or exceeds the switching flow rate.

The return mechanism may also be configured to keep the closure member in the open position, or at least to immediately transfer the closure member from the closed position back in the open position, in case of a (sudden) pressure surge on the upstream side of the stop valve.

Of course, the non-electrically driven actuator mechanism may also be configured and operatively coupled to the closure member such as to transfer the closure member from the closed position in the open position.

Preferably, the stop valve is configured such that valve does not open automatically by itself, that is, that the closure member remains in the closed position once the closure member has been transferred into the closed position. This may be given due a pressure difference building up between the downstream side and the upstream side of the closing member once the closure member is in the closed position. In the closed position, fluid accumulates on the upstream side of the closure member which causes an increase of the fluid pressure on the upstream side. If the pressure on the downstream side is lower, for example, as a result of an emptying or depressurization of the pipeline downstream of the valve, the closing force pressing the closure member against the valve seat further increases. This closing effect gets larger with an increasing pressure difference between the downstream side and the upstream side of the closing member. Thus, the stop valve remains closed, even if in case of an actuator mechanism involving a shape-memory material the temperature drops again below the switching temperature.

Furthermore, the stop valve may be configured to be resettable/openable manually, in particular only manually. That is, the stop valve may be configured such that the closure member is manually, in particular only manually, transferrable from the closed position in the open position upon having been activated and transferred into the closed position. This can be achieved by reversing the pressure difference between the downstream side and the upstream side of the closing member, for example, by relieving the pressure on the upstream side and/or by applying pressure on the downstream side.

Depending on the preferred application, the stop valve may be suitable for use in an ambient temperature range from 0 degree Celsius to at least 450 degree Celsius and for fluid temperatures up to 400 degree Celsius and designed for maximum pressures up to 170 bar. The flow velocity of the fluid can reach or exceed the speed of sound.

Applications of the stop valve and its inherent invention principle are conceivable in facility areas in which a pipeline is to be closed automatically and passively in a temperature-activated manner. Preferably, the stop valve is configured for use in a nuclear facility, in particular in a nuclear power plant. Alternatively, the stop valve may be used in a conventional chemical reactor and in a conventional power plant. The operating and design parameters mentioned above can vary greatly depending on the application. The necessary adjustments can then be made in particular by suitable material selection, component dimensioning, spring type and thermomechanical treatment of the shape-memory material.

A second aspect of the present invention relates to a stop valve for installation in a pipeline, in particular, in a pipeline of a nuclear facility, or in a conventional chemical reactor and conventional power plants, such as a nuclear power plant, or in a conventional chemical reactor and in a conventional power plant, in order stop a fluid flow through the pipeline in the event of an operational failure, for example the event of a pipeline leak. The stop valve comprises a valve housing including a flow channel passing through the valve housing. The stop valve further comprises a closure member which is arranged at least partially in the flow channel and reversibly transferrable between an open position and a closed position such as to open or close the flow channel through the valve housing. Furthermore, the stop valve comprises an actuator spring assembly operatively coupled to the closure member and arranged in the flow channel such as to be in direct contact with a fluid flowing through the flow channel during operation, wherein the spring assembly comprises a shape-memory material and is configured to change its shape upon reaching or exceeding a switching temperature due to heating by the fluid, thereby transferring the closure element from the open position in the closed position. The actuator spring assembly comprises a stack of star washers each of which comprises a washer ring and a plurality of spring arms extending in a star-shaped manner radially outward from the washer ring.

Further features and advantages of the actuator spring assembly have been described above with regard to the stop valve according to the first aspect of the present invention and, thus, equally apply to the stop valve according to the second aspect of the present invention. Therefore, these features and advantages will not be repeated.

In addition, the stop valve according to this second aspect of the present invention may comprise at least one position indicator to indicate whether the closure member is in the open position or in the closed position. The position indicator comprises at least one indicator member movably arranged in or at the valve housing between a first position and a second position. The indicator member is magnetically coupled to the closure member such that the indicator member is magnetically transferred into the first position when the closure member is transferred into the open position and into the second position when the closure member is transferred into the closed position.

Further features and advantages of the position indicator have been described above with regard to the stop valve according to the first aspect of the present invention and, thus, equally apply to the stop valve according to the second aspect of the present invention. Therefore, these features and advantages will not be repeated.

FIGS. 1-4 show an exemplary embodiment of a stop valve 1 according to the present invention. The valve 1 is configured for use in a pipeline 50, in particular in a pipeline of a nuclear facility, to stop a fluid flow through the pipeline 50 in the event of an operational failure in the facility. In general, the fluid may be a liquid, a gas or a mixture thereof, possibly in a supercritical state. Typically, the fluid may be pressurized in the pipeline. As an example, the stop valve 1 may be installed in a pipeline of a nuclear power plant which passes through the reactor containment and fluidly couples the primary coolant circuit inside the containment with a measuring or sampling device outside the containment. In this specific configuration, the stop valve 1 may serve to prevent radioactivity from escaping in areas outside the containment, for example, in the event of an excessive increase of the fluid temperature and/or the flow rate in the pipeline.

The stop valve 1 comprises a cylindrical valve housing 3 including a flow channel 5 passing through the valve housing 3. For connection with the pipeline 50, the cylindrical valve housing 3 comprises at each axial end a connector portion 8, 9 having an external thread. Each threaded connector portion 8, 9 is fixed via a coupling nut 51 with a respective coupling end of the pipeline 50. As can be in particular seen in FIG. 1, the flow channel 5 through the connector portions 8, 9 is conically tapered such that the cross-section of the flow channel 5 increases towards the respective axial end of the valve housing 3. Advantageously, the end sections of the pipelines 50 are also conically tapered at the outside such that the outer cross-section of the pipelines 50 decreases towards the respective free ends of the pipelines 50. Due to this, the end sections of the pipelines 50 accurately fit into the conically tapered end portions of the flow channel 5 through the valve housing 3. Beveled edges at the axial end faces of the connector portions 8, 9 facilitate fitting the stop valve with the pipeline.

Figure 2:
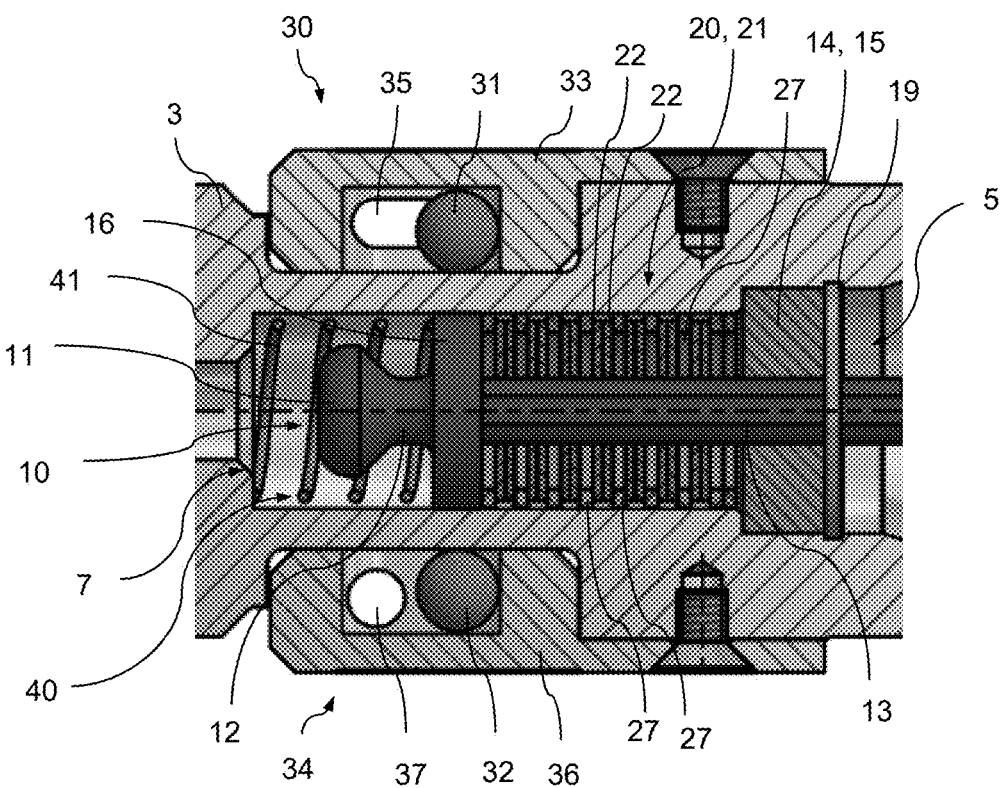
FIG. 2 is an enlarged partial view of the stop valve according to the embodiment shown in FIG. 1.

Within the flow channel 5, a closure member 10 is reversibly transferrable between an open position and a closed position such as to open or close the flow channel 5 through the valve housing 3. In the open position, as shown in FIGS. 1 and 2, the closure member is withdrawn from the valve seat, thereby clearing the fluid passage through the flow channel 5. Vice versa, in the closed position, the closure member 10 is in sealing contact with a valve seat 7, thereby closing the fluid passage through the flow channel 5 (not shown). In the present embodiment, when the stop valve 1 is open, a fluid flow is provided in the pipeline 50 from right to left as indicated by the arrow symbol on the top side of the valve 1 (see FIG. 3). Accordingly, the right connector portion 8 may be denoted as an inlet or upstream end of the valve 1, and the left connector portion 9 may be denoted as an outlet or a downstream end of the stop valve 1. When the stop valve 1 is closed, the fluid accumulates to the right of the closure member 10, causing an increase of the fluid pressure on the upstream side of the closure member. Accordingly, the right-hand side of the stop valve 1 may also be denoted as a high-pressure side or upstream side of the valve, while the left-hand side may be denoted as a low-pressure side or a downstream side of the valve 1.

In the present embodiment, the closure member 10 comprises a rounded closure cone 11 (also often denoted as valve cone), which is configured to interact in a sealing manner with the valve seat 7 (also denoted as sealing seat). The valve seat 7 is formed as an annular constriction in the cylindrical flow channel 5. The closure member 10 further comprises a cylindrical stem 12 which is formed on or rigidly connected to the closure cone 11 on a side facing away from the valve seat 7. The stem 12 has a smaller cross-section than the flow channel 5 in this area, enabling the fluid to readily flow around the stem 12. The closure member 10 further comprises a guiding disc 16 which is formed on or rigidly connected to the stem 12 opposite to the closure cone 11. The guiding disc 16 is configured to slidingly bear, guide and center the closure member 10 within the flow channel 5, in particular during the transfer between the open position and the closed position. In addition, the guiding disc 16 forms an abutment for an actuator mechanism 20 on the right-hand side of the disc 16, allowing this actuator mechanism 20 to exert an actuating force on the closure member 10 in order to transfer the closure member 10 from the open position in the closed position. In the present embodiment, the actuator mechanism 20 is an actuator spring assembly 21, details of which will be described in more detail below. In addition, the guiding disc 16 forms an abutment for a return mechanism 40 that is arranged on the left-hand side of the disc 16 and configured to transfer the closure member 10 from the closed position back in the open position. In the present embodiment, the return mechanism 40 comprises a helical return spring 41 which at the one end abuts the guiding disc 16, and at the other end abuts an end stop which this formed by the annular constriction defining the valve seat 7. The counteracting spring force of the return spring 41 is less than the spring force of the actuator spring assembly 21 when the actuator mechanism 20 is activated. For example, the spring force of the return spring 41 is about 50% of the spring force of the spring assembly 21, such that the force directed in the closed position exceeds any forces directed in the open position, As indicated above, the actuator mechanism 20 of the present embodiment is realized by an actuator spring assembly 21. At one end, the spring assembly 21 abuts the guiding disc 16. At the other end, the spring assembly 21 abuts an axial end stop 14 which is rigidly connected to the valve housing 3, thus enabling an axial expansion of the spring assembly 21 to be transferred into a movement of the closure member 10 relative to the valve housing 3 towards the valve seat 7. In the present embodiment, the axial end stop 14 is formed by an abutment disc 15 which is arranged in a shoulder portion of the flow channel 5 adjacent to the connector portion 8 at the inlet side. The abutment disc 15 is axially secured by a securing ring 19.

Both, the guiding disc 16 and the abutment disc 15 comprise a plurality of openings such as to provide a fluid passage through the respective disc 15, 16. For example, the guiding disc 16 and/or the abutment disc 15 may have the shape of a spoke wheel.

The spring assembly 21 according to the present embodiment comprises a stack of star washers 22, details of which are shown in FIGS. 5-7. Each star washer 22 comprises a washer ring 23 and a plurality of spring arms 24 extending in a star-shaped manner radially outward from the washer ring 23. In the present embodiment, each star washer 22 comprises twelve spring arms 24 which are equally disturbed around the outer circumference of the washer ring 23. The washer ring 23 defines a central opening 25. To facilitate assembly of the stack, the star washer 22 may be arranged along a cylindrical guiding rod 13 which extends through the central openings 25 of each star washer 22 along the center axis of the flow channel 5. The cylindrical guiding rod 13 may be connected to or integrally formed with the guiding disc 16 of the closure member 10. That is, the guiding rod 13 may be integral part of the closure member 10. As shown in FIG. 5, the cross-section of the central opening 25 of each star washer 22 may comprise one or more flat portions. Likewise, the cross-section of the cylindrical guiding rod 13 may comprise one or more flat portions which correspond to the one more flat portions of the central opening 25 such that the star washers 22 are locked against rotation. In addition, the guiding rod 13 may also be provided with through-holes to provide a fluid passage through the rod 13.

According to a preferred aspect of the present invention, the spring assembly 21 is made of a shape-memory material causing the spring assembly 21 to change its shape upon reaching or exceeding a switching temperature. In the present embodiment, the star washers 22 of the spring assembly 21 are made of a two-way shape-memory material, for example, an austenitic nickel-titanium-hafnium alloy. Below a so-called switching temperature, each star washer 22 is in a flat configuration in which the spring arms 24 are within a plane 26 defined by the washer ring 23. The flat configuration of the star washer is illustrated in FIG. 6 using continuous lines. With regard to the shape-memory effect, the flat configuration corresponds to the deformed shape. Upon reaching or exceeding the switching temperature, each star washer 22 returns to its pre-deformed ("remembered") shape in which the spring arms 23 bend out of the plane 26 in a direction transverse to the plane 26 (bend configuration). This configuration is illustrated in FIG. 6 using dashed lines. Due the bending of the arms 23, each star washer 22 experiences a specific axial expansion along a length axis of the stack upon reaching or exceeding the switching temperature. As a result, the actuator spring assembly 21 experiences an axial expansion along a length axis of the stack which causes the transfer of the closure member 10 from the open position in the closed position.

In the flat configuration, each star washer 22 has an axial dimension, i.e. a thickness in a range between 0.5 mm and 2 mm, in particular between 0.5 mm and 1 mm, preferably between 0.6 mm and 0.8 mm. Furthermore, each star washer 22 is configured such that the specific free axial expansion, i.e. the increase of the axial dimension of the star washer 22 when returning from the flat configuration into the bend configuration, is in a range between 0.2 mm and 1 mm, in particular between 0.3 mm and 0.7 mm, preferably about 0.5 mm.

On the one hand, the number of star washers 22 forming the stack is chosen such that a sum over the specific free axial expansions of all the star washers 22, which corresponds the total free axial expansion the stack, is larger, preferably at least 5 percent larger than the stroke length of the closure member 10 between the open position and the closed position. Due to this, the spring assembly 21 is biased upon having expanded and transferred the closure member in the closed position, thus exerting a spring force on the closure member 10 which securely press the closure cone 11 against the valve seat 7.

On the other hand, the number of star washers forming the stack preferably is chosen such that a sum over the specific free axial expansions of the star washers is at most 150 percent of a stroke length of the closure member 10. Advantageously, this avoids excessive stress on the actuator spring assembly 21 and the valve seat 7.

In the present embodiment, the star washers 22 are arranged such that the arms 23 of neighboring star washers 22 bend in opposite directions. Advantageously, this allows for achieving a large stroke length using a small number of star washers in the stack.

In addition, a support ring 27 is provided between each pair of neighboring star washers 22 the spring arms 23 of which bend towards each other upon reaching or exceeding the switching temperature in order to prevent the opposing arms bending towards each other from hocking together. Preferably, the support rings 27 are made of a non-magnetic material, in particular an austenitic stainless steel.

In the following, further details of the stop valve and its working principle are provided: During normal operation, the stop valve 1 is open as each one of the star washers 22 is in the flat configuration. Hence, fluid can freely flow through the pipeline 50 and the valve 1. For example, the fluid may be reactor coolant passing from the primary coolant circuit of a reactor through the pipeline 50 and the valve 1 towards a measuring or sampling device outside the reactor containment. In case of an accident release of reactor coolant within the containment, the temperature (and also the pressure) of the coolant causes the spring assembly to heat up due to the spring assembly 21 being in direct contact with the reactor coolant. Upon reaching or exceeding the switching temperature, the star washers turn into the expanded or bend configuration within a very short time (typically milliseconds to a few seconds), thereby transferring the closure member 10 from the open position in the closed position as described above. Once the closure member 10 is in the closed position, fluid accumulates on the upstream side of the closure member 10 which causes an increase of fluid pressure on the upstream side. If the pressure on the downstream side is lower, for example as a result of an emptying or depressurization of the pipeline 50 downstream of the valve, the closing force pressing the closure member 10 against the valve seat 7 further increases. This additional sealing effect gets larger with an increasing pressure difference between the downstream side and the upstream side of the closing member 10. Due to the pressure difference, the stop valve 1 remains closed even if the temperature drops again below the switching temperature. The valve 1 only opens again when the pressure difference decreases towards the initial value. This can be achieved, for example, by relieving the pressure on the upstream side of the valve 1 and/or by applying pressure on the downstream side.

To reliable monitor the actual valve position (open/closed), the stop valve 1 according to the present embodiment comprises a first and a second position indicator 30, 34 which indicate whether the closure member 10 is in the open position or in the closed position. Both, the first position indicator 30 and the second position indicator 34 comprise a magnetic indicator member 31, 32 which is magnetically coupled to the closure member 10 to follow its movement between the open position and the closed position. In the present embodiment, each indicator member 31, 32 is a ball made of a permanent-magnetic material for example, neodymium-iron-boron or samarium-cobalt. The closure member 10 is made of a magnetic material, such as ferromagnetic stainless steel. Due to this specific material pairing, each of the indicator members 31, 33 is magnetically coupled (attraction) to the closure member 10. Hence, when the closure member 10 is transferred between the open and the closed position, the indicator members 31, 32 magnetically follow the movement of the closure member 10 between a respective first and a respective second position.

Figure 3:
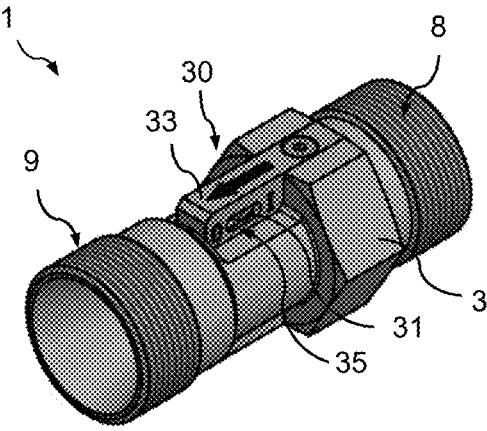
FIG. 3 is a perspective view of the stop valve according to the embodiment shown in FIG. 1.
Figure 4:
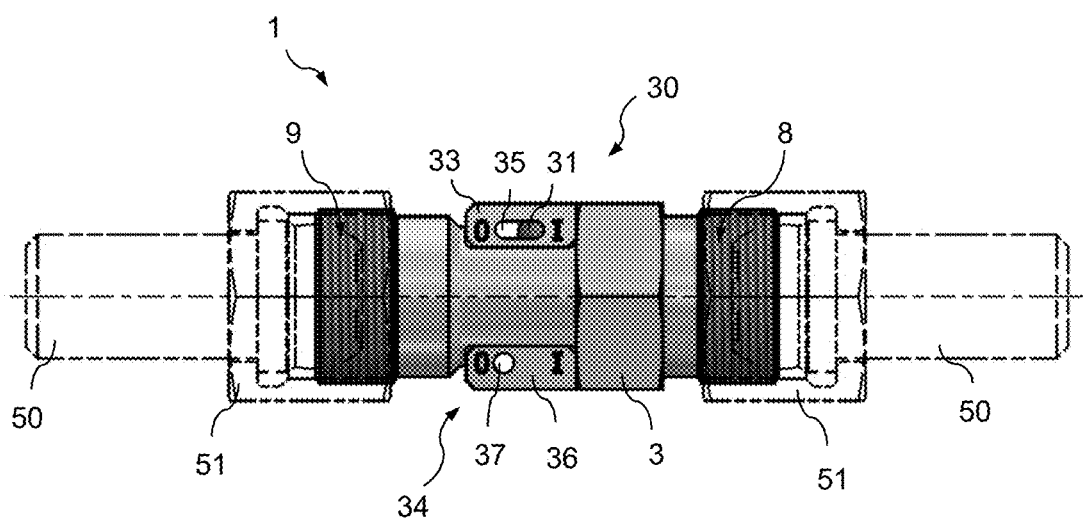
FIG. 4 is a side view of the stop valve according to the embodiment shown in FIG. 1.

As can be in particular seen in FIGS. 1 and 2, each of the indicator members 31, 32 is movably arranged in a respective guide cage 33, 36, which are arranged latterly at opposing sides of the stop valve 1. Each of the guide cages 33, 36 comprises an elongate cavity defining a guide track for the respective indicator member 31, 32 that is aligned parallel to the trajectory of the closure member 10 between the open position and the closed position. As can be further seen in FIGS. 1 and 2, the length of the guide track, i.e. the length of the elongate cavity, substantially corresponds to the stroke length of the closure member 10 between the open position and the closed position. Hence, when the closure member 10 is in the open position as shown in FIG. 3 and FIG. 4, each one of the indicator members 31, 32 is in its respective first positon in which it abuts a first (upstream) end of the respective guide track. Likewise, when the closure member 10 is in the closed position (not shown), each one of the indicator members 31, 32 is in its respective second positon in which it abuts a second (downstream) end of the respective guide track.

For determining the position of the closure member 10 by mere inspection of the valve from outside, the guide cage 33 of the first position indicator 30 comprises two elongate inspection windows 35. The elongate inspection windows 35 are arranged on opposing sides of the guide cage 33 parallel to the guide track such as to release a view on the indicator member 31 from outside along the entire guide track, in particular when the indicator member 31 is in the first position and the second position, and thus when the closure member 10 is in the open or closed position, respectively.

In contrast, the guide cage 36 of the second position indicator 34 comprises two circular inspection windows 37 which are arranged on opposing sides of the guide cage 36 such as to release a view on the indicator member 32 from outside only when the indicator member 32 is in the second position and thus when the closure member 10 is in the closed position. However, when the indicator member 32 is not visible through the inspection windows 37, the second position indicator 34 still implicitly indicates that the indicator member must be in the first position and thus that the closure member must be in the open position. Of course, it is possible that the guide cage 36 comprises one or more further (circular) inspection windows (not shown) which are arranged such as to release a view on the indicator member 32 from outside when the indicator member 32 is in the first position.

It is also possible that one of or each one of the guide cages 33, 36 comprises a respective inspection window on one side of the guide cages 33, 36 only. Furthermore, it is possible that the stop valve comprises only one of the first and the second position indicator 30, 34.

Advantageously, the permanent nature of the magnetic coupling and the possibility to determine the position of the closure member by mere inspection allows for a reliable and failure-free operation in any circumstances. In particular, this kind of position monitoring does not require any external power supply and thus still reliably works even in case of a total power breakdown in the facility.

The invention claimed is:

1. A stop valve for installation in a pipeline to stop a fluid flow through the pipeline in the event of an operational failure, the stop valve comprising:
   a valve housing including a flow channel passing through the valve housing,
   a closure member arranged at least partially in the flow channel and reversibly transferrable between an open position and a closed position such as to open or close the flow channel through the valve housing,
   a non-electrically driven actuator mechanism operatively coupled to the closure member for transferring the closure member at least from the open position in the closed position, wherein the actuator mechanism is configured to be activated by a fluid flow through the flow channel reaching or exceeding a switching temperature and/or switching flow rate during operation, and
   at least one position indicator to indicate whether the closure member is in the open position or in the closed position,
   wherein the position indicator comprises at least one indicator member movably arranged in or at the valve housing between a first position and a second position, wherein the indicator member is magnetically coupled to the closure member such that the indicator member is magnetically transferred into the first position when the closure member is transferred into the open position, and into the second position when the closure member is transferred into the closed position,
   wherein the non-electrically driven actuator mechanism comprises an actuator spring assembly operatively coupled to the closure member and arranged in the flow channel such as to be in direct contact with a fluid flowing through the flow channel during operation, wherein the spring assembly comprises a shape-memory material and is configured to change its shape upon reaching or exceeding a switching temperature due to heating by the fluid, thereby transferring the closure member from the open position in the closed position, and
   wherein the actuator spring assembly comprises a stack of star washers each of which comprises a washer ring and at least three spring arms extending in a star-shaped manner radially outward from the washer ring, wherein upon reaching or exceeding the switching temperature each star washer experiences a specific axial expansion along a length axis of the stack due to its arms bending in a direction transverse to a plane defined by the washer ring.

2. The stop valve according to claim 1, wherein the indicator member is visible from outside the valve housing when being in at least one of the first position or the second position.

3. The stop valve according to claim 1, wherein the indicator member is magnetically coupled to the closure member directly or indirectly.

4. The stop valve according to claim 1, wherein the indicator member and/or an indicator coupling element fixedly coupled to the indicator member comprises a permanent-magnetic material.

5. The stop valve according to claim 4, wherein the indicator member and/or the indicator coupling element fixedly coupled to the indicator member comprises a neodymium-iron-boron permanent magnet or samarium-cobalt permanent magnet.

6. The stop valve according to claim 1, wherein the indicator member has a ball shape.

7. The stop valve according to claim 1, wherein the indicator member is moveably guided between the first position and the second position in a guide cage.

8. The stop valve according to claim 7, wherein the guide cage comprises at least one inspection window configured and arranged to release a view on the indicator member from outside the valve housing when the indicator member is in at least one of the first position or the second position.

9. The stop valve according to claim 1, wherein the closure member and/or a closure coupling element fixedly coupled to the closure member comprises a magnetic material.

10. The stop valve according to claim 1, wherein the valve housing is made of a non-magnetic material.

11. The stop valve according to claim 1, wherein the star washers are arranged such that the arms of neighboring star washers bend in opposite directions.

12. The stop valve according to claim 1, wherein a number of star washers forming the stack is chosen such that a sum over the specific free axial expansions of all the star washers is at least 110 percent of a stroke length of the closure member between the open position and the closed position and/or at most 150 percent of a stroke length of the closure member between the open position and the closed position.

13. The stop valve according to claim 1, further comprising at least one support ring between each pair of neighboring star washers or between each pair of neighboring star washers, the arms of which bend towards each other upon reaching or exceeding the switching temperature.

14. The stop valve according to claim 7, wherein the guide cage comprises at least one open inspection window configured and arranged to release a view on the indicator member from outside the valve housing when the indicator member is in at least one of the first position or the second position.

15. The stop valve according to claim 1, wherein the valve housing is made of an austenitic stainless steel.

16. The stop valve according to claim 1, wherein a number of star washers forming the stack is chosen such that a sum over the specific free axial expansions of all the star washers is from 110 percent to 150 percent of a stroke length of the closure member between the open position and the closed position.

* * * * *